US012759650B2

(12) United States Patent
Heinzer

(10) Patent No.: US 12,759,650 B2
(45) Date of Patent: Oct. 13, 2026

(54) FAIRING ASSEMBLY FOR A COMMERCIAL VEHICLE

(71) Applicant: DAIMLER TRUCK AG, Leinfelden-Echterdingen (DE)

(72) Inventor: Hans Heinzer, Portland, OR (US)

(73) Assignee: Daimler Truck AG, Leinfelden-Echterdingen (DE)

( * ) Notice: Subject to any disclaimer, the term of this patent is extended or adjusted under 35 U.S.C. 154(b) by 453 days.

(21) Appl. No.: 18/268,077

(22) PCT Filed: Nov. 25, 2021

(86) PCT No.: PCT/EP2021/082933

§ 371 (c)(1),
(2) Date: Jun. 16, 2023

(87) PCT Pub. No.: WO2022/128383

PCT Pub. Date: Jun. 23, 2022

(65) Prior Publication Data

US 2024/0051622 A1 Feb. 15, 2024

(30) Foreign Application Priority Data

Dec. 17, 2020 (GB) ...................................... 2019928

(51) Int. Cl.
*B62D 35/02* (2006.01)
*B62D 35/00* (2006.01)

(52) U.S. Cl.
CPC ........... *B62D 35/02* (2013.01); *B62D 35/001* (2013.01)

(58) Field of Classification Search
None
See application file for complete search history.

(56) References Cited

U.S. PATENT DOCUMENTS 3,209,850 A * 10/1965 Fish .......................... B60P 3/16 180/22
4,486,046 A 12/1984 Whitney
(Continued)

FOREIGN PATENT DOCUMENTS

| | | |
|---|---|---|
| DE | 202018101555 | 4/2018 |
| WO | 0136255 | 5/2001 |
| WO | 2019168545 | 9/2019 |

OTHER PUBLICATIONS

Intellectual Property Office, Search Report Under Section 17(5) issued in International Application No. GB2019928.7, May 14, 2021, 2 pp.
(Continued)

*Primary Examiner* — Joseph D. Pape
(74) *Attorney, Agent, or Firm* — ArentFox Schiff LLP

(57) ABSTRACT

The invention relates to a fairing assembly for a commercial vehicle, the fairing assembly comprising at least one deflector device configured to be mounted to a frame of the commercial vehicle, and to be arranged in front of at least one drive axle of the commercial vehicle, wherein the deflector device comprises at least two air guiding surface facing each other, the air guiding surfaces extending towards each other in the longitudinal direction of the vehicle towards the rear of the commercial vehicle thereby bounding at least one channel for air flowing under the commercial vehicle, the channel tapering in the longitudinal direction of the vehicle towards the rear.

20 Claims, 1 Drawing Sheet

(56) References Cited

U.S. PATENT DOCUMENTS

| | | | | |
|---|---|---|---|---|
| 6,685,256 | B1 * | 2/2004 | Shermer | B62D 35/001<br>296/180.1 |
| 7,093,889 | B2 * | 8/2006 | Graham | B60R 19/565<br>296/180.1 |
| 9,132,869 | B2 * | 9/2015 | Dayton | B62D 35/02 |
| 9,669,884 | B2 * | 6/2017 | Bassily | B62D 35/001 |
| 10,850,779 | B1 | 12/2020 | Magee | |
| 11,072,377 | B2 * | 7/2021 | Rose | F16B 2/185 |
| 2006/0252361 | A1 * | 11/2006 | Henderson | B62D 35/001<br>454/118 |
| 2010/0117396 | A1 * | 5/2010 | Dayton | B62D 35/001<br>296/180.1 |
| 2013/0076066 | A1 * | 3/2013 | Wong | B62D 35/001<br>296/180.4 |
| 2015/0197291 | A1 | 7/2015 | Roush | |
| 2016/0121940 | A1 | 5/2016 | Courtney | |
| 2020/0290687 | A1 | 9/2020 | Magee | |

OTHER PUBLICATIONS

Patent Cooperation Treaty, International Searching Authority, Notification of Transmittal of the International Search Report and the Written Opinion of the International Searching Authority, or the Declaration, issued in International Application No. PCT/EP2021/082933, Mar. 1, 2022, 12 pp.

Patent Cooperation Treaty, Notification Concerning Transmittal of the International Preliminary Report on Patentability (Chapter I of the Patent Cooperation Treaty) issued in International Application No. PCT/EP2021/082933, Jun. 13, 2023, 7 pp.

* cited by examiner

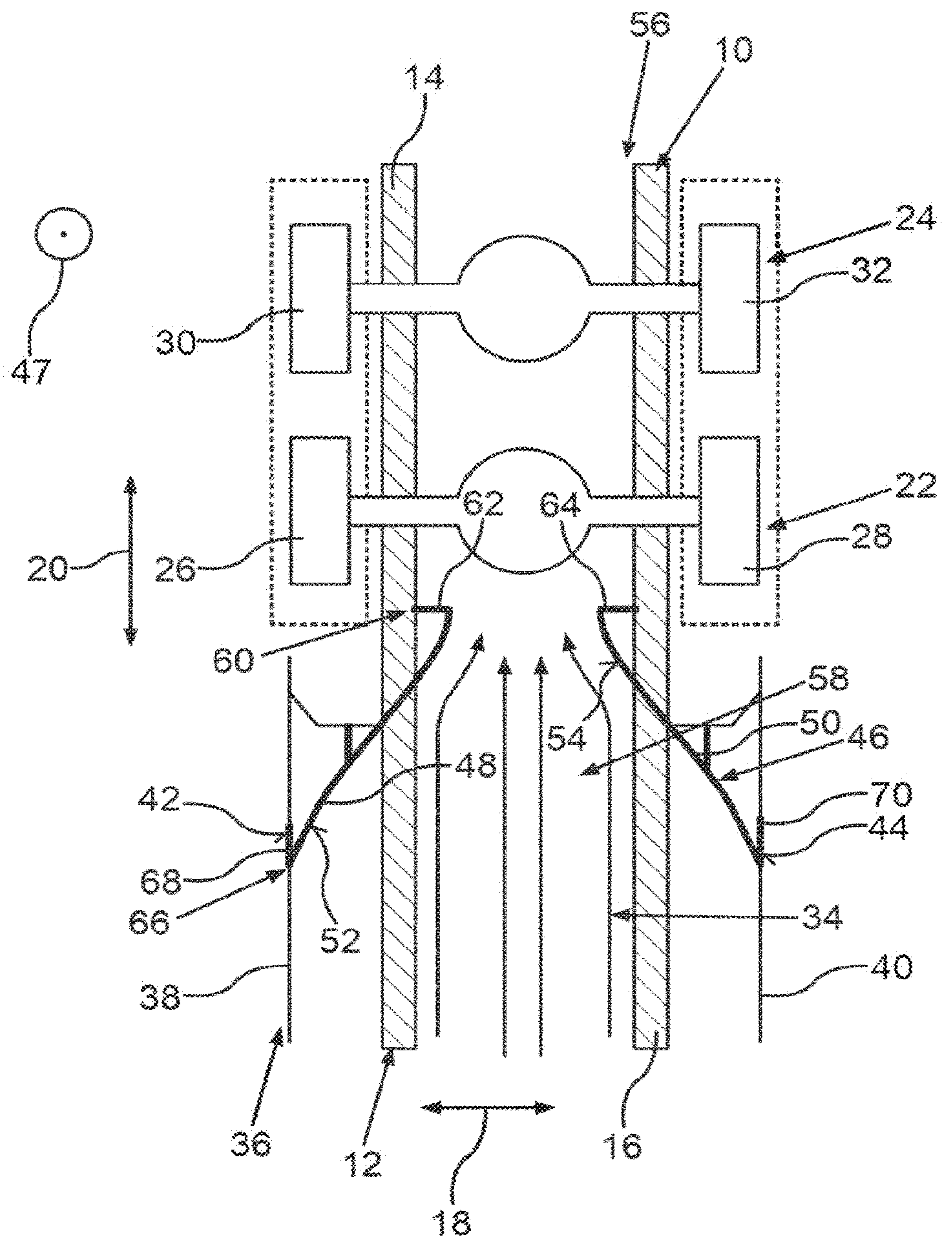
56
10
14
24
32
30
47
22
62
64
28
20
26
60
58
54
50
46
48
42
70
44
68
66
52
34
38
40
36
12
16
18

FAIRING ASSEMBLY FOR A COMMERCIAL VEHICLE

CROSS-REFERENCE TO RELATED APPLICATIONS

This application is a U.S. national phase application filed under 35 U.S.C. § 371 of International Application No. PCT/EP2021/082933, filed Nov. 25, 2021, designating the United States, which claims priority from British patent application No. 2019928.7, filed Dec. 17, 2020, both of which are hereby incorporated by reference herein in their entireties.

FIELD OF THE INVENTION

The invention relates to a fairing assembly for a commercial vehicle.

BACKGROUND INFORMATION

WO 2019/168545 A1 shows an apparatus for a trailer, the apparatus comprising a top fairing configured to be mounted to a top surface of the trailer at a location closer to the back of the trailer than the front of the trailer. Furthermore, WO 2019/168548 A1 shows an apparatus for a trailer, the apparatus comprising a top fairing configured to be mounted to a top surface of the trailer, wherein the trailer has a longitudinal direction, a lateral direction, and a vertical direction. Furthermore, US 2009/0146453 A1 shows a vehicle underbody fairing apparatus for reducing aerodynamic drag caused by a vehicle wheel assembly supporting a vehicle body from thereunder.

SUMMARY OF THE INVENTION

It is an object of the present invention to provide a fairing assembly for a commercial vehicle such that a particularly advantageous aerodynamic performance of the commercial vehicle may be realized.

This object is solved by the subject-matter of the independent claim. Advantageous embodiment with expedient developments of the invention are indicated in the dependent claims.

The invention relates to a fairing assembly for a commercial vehicle such as a truck. The fairing assembly comprises at least one deflector device which is configured to be mounted to a frame of the commercial vehicle. For example, the frame is configured as a ladder frame. Moreover, the deflector device is configured to be arranged in front of at least one drive axle of the commercial vehicle. This means, in the completely assembled state of the commercial vehicle, the deflector device is mounted to the frame in such a way that the deflector device is arranged in front of the drive axle with respect to the longitudinal direction of the vehicle. For example, the drive axle may comprise at least two wheels of the commercial vehicle, the wheels being spaced away from each other in the transverse direction of the vehicle. Since the wheels are wheels of the drive axle, the wheels are drivable by at least one motor of the commercial vehicle. Thus, the wheels are also referred to as drive wheels. By driving the wheels (i.e. the drive axle), the commercial vehicle is driven by the motor.

The deflector device comprises at least two air guiding surfaces which face each other, in particular in the completely assembled state of the commercial vehicle. The air guiding surfaces extend towards each other in the longitudinal direction of the vehicle towards the rear of the commercial vehicle such that the air guiding surfaces bound or define at least one channel for air flowing under the commercial vehicle, in particular when the commercial vehicle drives forward. This means that, in particular when the commercial vehicle drives forward, air flows under the commercial vehicle and in the longitudinal direction of the vehicle towards the rear. The air flowing under the commercial vehicle flows through said channel which, since the air guiding surfaces extend towards each other in the longitudinal direction of the vehicle towards the rear, tapers in the longitudinal direction of the vehicle towards the rear. Thus, the channel is or acts as a nozzle providing a nozzle effect to accelerate the air and thus an airflow under the commercial vehicle past the drive wheels. Thus, particularly good aerodynamics of the commercial vehicle may be realized such that the commercial vehicle may be driven particularly efficiently. Particularly, the fairing assembly according to the present invention may improve the aerodynamic performance of the commercial vehicle with respect to conventional vehicles, in particular in real world situations. For example, when the commercial vehicle travels along a road thereby bouncing and/or rolling down the road, air may flow under the commercial vehicle. In such a situation, for example, the fairing assembly according to the present invention helps guide the air away from the turbulent drive wheels such that particularly advantageous aerodynamics of the commercial vehicle may be realized.

Further advantages, features, and details of the invention derive from the following description of a preferred embodiment as well as from the drawing. The features and feature combinations previously mentioned in the description as well as the features and feature combinations mentioned in the following description of the FIGURE and/or shown in the FIGURE alone can be employed not only in the respectively indicated combination but also in any other combination or taken alone without leaving the scope of the invention.

BRIEF DESCRIPTION OF THE DRAWINGS

The novel features and characteristic of the disclosure are set forth in the appended claims. The accompanying drawings, which are incorporated in and constitute a part of this disclosure, illustrate exemplary embodiments and together with the description, serve to explain the disclosed principles. In the FIGURES, the left-most digit(s) of a reference number identifies the FIGURE in which the reference number first appears. The same numbers are used throughout the FIGURES to reference like features and components. Some embodiments of system and/or methods in accordance with embodiments of the present subject matter are now described below, by way of example only, and with reference to the accompanying FIGURES.

The drawing shows in the only FIGURE part of a schematic top view of a commercial vehicle comprising a fairing assembly according to the present invention.

In the FIGURE the same element or elements having the same function are indicated by the same reference signs.

DETAILED DESCRIPTION

In the present document, the word “exemplary” is used herein to mean “serving as an example, instance, or illustration”. Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawing and will be described in detail below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion so that a setup, device or method that comprises a list of components or steps does not include only those components or steps but may include other components or steps not expressly listed or inherent to such setup or device or method. In other words, one or more elements in a system or apparatus preceded by "comprises" or "comprise" does not or do not, without more constraints, preclude the existence of other elements or additional elements in the system or method.

In the following detailed description of the embodiment of the disclosure, reference is made to the accompanying drawing that forms part hereof, and in which is shown by way of illustration a specific embodiment in which the disclosure may be practiced. This embodiment is described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The only FIGURE shows, in a schematic top view, a commercial vehicle 10 which may be configured as a truck. The commercial vehicle 10 comprises a frame 12 which may be configured as a ladder frame. The frame 12 comprises two longitudinal members 14 and 16 which are spaced away from each other in the transverse direction of the vehicle. The transverse direction of the vehicle is illustrated by double arrow 18 in the FIGURE. Moreover, a double arrow 20 illustrates the longitudinal direction of the vehicle. The frame 12 may comprise at least one cross member which is not shown in the FIGURE. For example, the cross member is attached to the longitudinal members 14 and 16 such that the longitudinal members 14 and 16 are connected with each other by said cross member. The longitudinal members 14 and 16 are also referred to as frame rails.

The commercial vehicle 10 comprises two drive axles 22 and 24 which are arranged one after another in the longitudinal direction of the vehicle. For example, the drive axle 22 and 24 are at least indirectly held on the frame 12. The respective drive axle 22, 24 comprises at least two wheels 26, 28 and 30, 32 respectively. The respective wheels 26, 28 and 30, 32 of the respective drive axle 22, 24 are spaced away from each other in the transverse direction of the vehicle. Moreover, preferably, the respective wheels 26, 28 and 30, 32 of the respective drive axles 22, 24 are arranged coaxially to each other. Furthermore, the commercial vehicle 10 comprises at least one motor which is not shown in the FIGURE. Said motor may be configured as an internal combustion engine or as an electric machine. Said motor is configured to drive the wheels 26, 28, 30 and 32 of the drive axles 22 and 24, thereby driving the commercial vehicle 10. Thus, the wheels 26, 28, 30 and 32 are also referred to as drive wheels.

For example, the commercial vehicle 10 may comprise a third axle which is not shown in the FIGURE. The third axle may be arranged in front of the drive axles 22 and 24 in the longitudinal direction of the vehicle. Preferably, said third axle is a non-drive axle comprising wheels which may not be driven by said motor. Since, for example, the third axle may be arranged in front of the drive axles 22 and 24 in the longitudinal direction of the vehicle, the third axle may be configured as a front axle. In this regard, for example, the drive axle 22 may be arranged between the third axle and the drive axle 24 in the longitudinal direction of the vehicle. When the commercial vehicle 10 is driven by the motor in such a way that the commercial vehicle 10 drives forward, air flows under the commercial vehicle 10. The air flowing under the commercial vehicle 10 is illustrated by arrows 34 in the FIGURE.

In order to realize a particularly advantageous aerodynamic performance of the commercial vehicle 10, the commercial vehicle 10 is equipped with a fairing assembly 36 which is at least indirectly mounted to the frame 12. The fairing assembly 36 comprises side fairings 38 and 40 which are arranged further out than the longitudinal members 14 and 16 in the transverse direction of the vehicle. For example, at least respective length areas of the longitudinal members 14 and 16 are overlapped and thus covered by the side fairings 38 and 40 in the transverse direction of the vehicle outwardly. Preferably, the respective side fairing 38, 40 comprises or forms an air guiding surface 42, 44 extending in a respective plane which is spanned by the longitudinal direction of the vehicle and the vertical direction of the vehicle. The vertical direction of the vehicle is illustrated by double arrow 47. Moreover, the air guiding surfaces 42 and 44 face away from each other in the transverse direction of the vehicle.

Conventionally, under truck aerodynamics of commercial vehicles do not have any component controlling an air flow under the respective commercial vehicle. This may lead to air flowing directly into the drive wheels at the rear of the commercial vehicle. This region of the commercial vehicle may have violent air turbulence, and adding additional air to said region may negatively impact aerodynamics.

In order to realize particularly advantageous aerodynamics of the commercial vehicle 10, the fairing assembly 36 comprises a deflector device 46 having at least two air deflectors 48 and 50. For example, the air deflectors 48 and 50 are spaced away from each other in the transverse direction of the vehicle. The deflector device 46 and thus the air deflectors 48 and 50 are mounted to the frame 12 at least indirectly. Moreover, the deflector device 46 and thus the air deflectors 48 and 50 are arranged in front of the drive axles 22 and 24 in the longitudinal direction of the vehicle. The deflector device 46 comprises two air guiding surfaces 52 and 54 facing each other. The air guiding surface 52 is formed by the air deflector 48, and the air guiding surface 54 is formed by the air deflector 50. Moreover, the air guiding surfaces 52 and 54 extend towards each other in the longitudinal direction of the vehicle towards the rear 56 of the commercial vehicle 10 such that the air guiding surfaces 52 and 54 bound or define a channel 58 for the air flowing under the commercial vehicle 10 (i.e. for the air illustrated by the arrows 34). Since the air guiding surfaces 52 and 54 extend towards each other in the longitudinal direction of the vehicle 10 towards the rear 56, the channel 58 tapers in the longitudinal direction of the vehicle towards the rear 56.

The deflector device 46 comprises a mounting device 60 having first mounting points 62 and 64 by which the air deflectors 48 and 50 and thus the deflector device 46 are, in particular directly, mounted to the respective longitudinal members 14 and 16. Furthermore, the deflector device 46 comprises a fixing device 66 having second mounting points 68 and 70 by which the air deflectors 48 and 50 and thus the deflector device 46 are mounted to the respective side fairings 38 and 40. The deflector device 46 is an air deflector device under the commercial vehicle 10, wherein the deflector device 46 is arranged or rides just above the ground and diverts the air flowing under the commercial vehicle 10 and past the drive wheels 26, 28, 30 and 32.

For example, the respective air deflectors 48 and 50 are configured as or formed by a panel which may be made of SMC (sheet molding compound) or another plastic material. In other words, the respective air deflectors 48 and 50 may be made of a plastic material, in particular SMC. Preferably, the respective air deflector 48 and 50 may comprise a soft flexible piece on its bottom to allow for dynamic contact. This means that when said piece comes in contact with the ground or an object arranged on the ground, said piece may elastically deform in response to said contact. After the contact, the piece springs back thereby returning to its initial position.

Instead of pushing the air flowing under the commercial vehicle 10 around the outside of the drive wheels 26, 28, 30 and 32, the deflector device 46 directs the air between the drive wheels 26, 28, 30 and 32. Since the channel 58 tapers in the longitudinal direction of the vehicle towards the rear 56, the channel 58 has a nozzle effect thereby accelerating the air flowing under the commercial vehicle 10. Thus, the air may flow past the drive wheels 26, 28, 30 and 32 without creating excessive air turbulence. Thus, the commercial vehicle 10 may be driven particularly efficiently.

REFERENCE SIGNS

10 commercial vehicle
12 frame
14 longitudinal member
16 longitudinal member
18 double arrow
20 double arrow
22 drive axle
24 drive axle
26 wheel
28 wheel
30 wheel
32 wheel
34 arrows
36 fairing assembly
38 side fairing
40 side fairing
42 air guiding surface
44 air guiding surface
46 deflector device
47 double arrow
48 air deflector
50 air deflector
52 air guiding surface
54 air guiding surface
56 rear
58 channel
60 mounting device
62 mounting point
64 mounting point
66 fixing device
68 mounting point
70 mounting point

The invention claimed is:

1. A fairing assembly for a commercial vehicle, comprising:

at least one deflector device configured to be mounted to a frame of the commercial vehicle, and to be arranged in front of at least one drive axle of the commercial vehicle having a first drive wheel at a first end spaced away from a second drive wheel at a second end;

wherein the at least one deflector device comprises at least two air deflectors spaced away from each other in a transverse direction of the commercial vehicle; and wherein the at least two air deflectors comprise at least two air guiding surfaces facing each other, the at least two air guiding surfaces extending from a first air guiding surface end to a second air guiding surface end towards each other in a longitudinal direction of the commercial vehicle towards a rear of the commercial vehicle thereby bounding at least one channel for air flowing under the commercial vehicle between the first drive wheel and the second drive wheel, the at least one channel tapering in the longitudinal direction of the commercial vehicle towards the rear, wherein a rear end of the at least one channel is between the first drive wheel and the second drive wheel in the transverse direction.

2. The fairing assembly according to claim 1, wherein the at least one deflector device comprises at least one mounting device by which the at least one deflector device is mountable to respective longitudinal members of the frame.

3. The fairing assembly according to claim 1, wherein the fairing assembly comprises at least two side fairings.

4. The fairing assembly according to claim 3, wherein the at least one deflector device comprises at least one fixing device by which the at least one deflector device is mounted to a respective side fairing of the at least two side fairings.

5. The fairing assembly according to claim 1, wherein respective ones of the at least two air guiding surfaces are formed by respective ones of the at least two air deflectors of the at least one deflector device.

6. The fairing assembly according to claim 1, wherein the at least one channel defines a nozzle configured to accelerate the air flowing under the commercial vehicle past the first drive wheel and the second drive wheel of the at least one drive axle.

7. The fairing assembly according to claim 1, wherein the at least one drive axle comprises at least two drive axles arranged one after another in the longitudinal direction of the commercial vehicle, and the at least one deflector device is arranged in the front of both of the at least two drive axles.

8. The fairing assembly according to claim 1, wherein the at least two air deflectors comprise panels made of a plastic material.

9. The fairing assembly according to claim 1, wherein at least one of the at least two air deflectors comprises:

a bottom surface facing a ground surface; and a flexible piece on the bottom surface configured for dynamic contact with the ground surface.

10. The fairing assembly according to claim 9, wherein the flexible piece is configured to elastically deform in response to the dynamic contact.

11. The fairing assembly according to claim 2, wherein the at least one mounting device comprises first mounting points by which the at least two air deflectors are directly mounted to the respective longitudinal members of the frame.

12. The fairing assembly according to claim 4, wherein the at least one fixing device comprises second mounting points by which the at least two air deflectors are mounted to respective side fairings.

13. The fairing assembly according to claim 1, wherein the fairing assembly comprises:

a first side fairing mounted outside a first side of the frame; and a second side fairing mounted outside a second side of the frame.

14. The fairing assembly according to claim 13, wherein each of the first side fairing and the second side fairing comprises a respective air guiding side surface extending in a respective plane spanned by the longitudinal direction of the commercial vehicle and a vertical direction of the commercial vehicle, wherein each of the first side fairing and the second side fairing is arranged in the front of the at least one drive axle.

15. The fairing assembly according to claim 1, wherein the frame comprises a first longitudinal member spaced away from a second longitudinal member in the transverse direction of the commercial vehicle between the first drive wheel and the second drive wheel, and the at least two air deflectors are respectively mounted to one of the first longitudinal member and the second longitudinal member.

16. The fairing assembly according to claim 15, further comprising:

a first mounting point extending between and connecting the second air guiding surface end of a first air guiding surface of the at least two air guiding surfaces to the first longitudinal member; and a second mounting point extending between and connecting the second air guiding surface end of a second air guiding surface of the at least two air guiding surfaces to the second longitudinal member.

17. The fairing assembly according to claim 16, further comprising:

a first fixing device and a second fixing device respectively mounting the first air guiding surface end of the first air guiding surface and the first air guiding surface end of the second air guiding surface respectively to a first side fairing and a second side fairing of the fairing assembly.

18. A fairing assembly for a commercial vehicle, comprising:

a first air deflector having a first air guiding surface with a first rearward air guiding surface end, wherein the first air deflector is arranged in a front of at least one drive axle of the commercial vehicle relative to a longitudinal direction of the commercial vehicle, the at least one drive axle having a first drive wheel at a first end spaced away from and directly facing a second drive wheel at a second end, wherein the first rearward air guiding surface end is between the first drive wheel and the second drive wheel; and a second air deflector spaced away from the first air deflector in a transverse direction of the commercial vehicle, the second air deflector having a second air guiding surface with a second rearward air guiding surface end, wherein the second air deflector is arranged in the front of the at least one drive axle of the commercial vehicle, wherein the second rearward air guiding surface end is between the first drive wheel and the second drive wheel;

wherein the first air guiding surface and the second air guiding surface extend towards each other in the longitudinal direction of the commercial vehicle towards a rear of the commercial vehicle so as to define a tapering channel between the first drive wheel and the second drive wheel to direct air flowing under the commercial vehicle past the first drive wheel and the second drive wheel.

19. The fairing assembly according to claim 18, wherein the first rearward air guiding surface end is mounted to a first longitudinal member of a frame of the commercial vehicle, wherein the second rearward air guiding surface end is mounted to a second longitudinal member of the frame that is spaced apart in the transverse direction from the first longitudinal member, wherein the first longitudinal member and the second longitudinal member are between the first drive wheel and the second drive wheel.

20. The fairing assembly according to claim 19, further comprising:

a first side fairing positioned outside of the first longitudinal member;

a second side fairing mounted outside of the second longitudinal member;

a first fixing device connecting a first forward air guiding surface end of the first air guiding surface to the first side fairing; and a second fixing device connecting a second forward air guiding surface end of the second air guiding surface to the second side fairing.

* * * * *